United States Patent

[11] 3,619,393

| [72] | Inventor | Eldon E. Stahly<br>Ellicott City, Md. |
|---|---|---|
| [21] | Appl. No. | 882,340 |
| [22] | Filed | Dec. 4, 1969 |
| [45] | Patented | Nov. 9, 1971 |
| [73] | Assignee | W. R. Grace & Co.<br>New York, N.Y. |

[54] PROCESS FOR THE PREPARATION OF SHELF-STABLE, PHOTOCURABLE POLYTHIOLS
14 Claims, No Drawings

[52] U.S. Cl. ..................................................204/159.15,
204/159.13, 204/159.18, 204/159.23, 204/159.24,
260/79, 260/827, 260/857 R, 260/858, 260/860,
260/874, 260/887, 260/889, 260/890

[51] Int. Cl. ........................................................ C08d 1/00,
C08f 1/16, C08g 23/00

[50] Field of Search............................................204/159.18,
159.15, 159.24; 260/79

[56] References Cited
UNITED STATES PATENTS

| 3,503,940 | 3/1970 | Oswald..................... | 204/159.23 |
| 3,338,810 | 8/1967 | Warner ..................... | 204/159.18 |

*Primary Examiner*—Murray Tillman
*Assistant Examiner*—Richard B. Turer
*Attorney*—Kenneth E. Prince ABSTRACT: Free-radical scavenger-vinyl stabilizers are incorporated into photocurable compositions to give the composition storage stability for months. The photocurable composition contains a polythiol that adds to the vinyl group of the stabilizers upon photocuring with U.V. light, so that the stabilizer is chemically bound in the polymer molecules. The photocurable compositions can contain polyenes that also polymerize with the polythiol and can contain photocuring rate accelerators. A preferred stabilizer is triallyl phosphite. The incorporated stabilizers can be present in sufficient amounts to make the cured polymeric systems burn-resistant.

3,619,393

PROCESS FOR THE PREPARATION OF SHELF-STABLE, PHOTOCURABLE POLYTHIOLS

BACKGROUND OF THE INVENTION

1. Objectives of the Invention

An object of this invention is to produce a shelf-stable polymer which can be photopolymerized, and a second object is to develop burn-resistant polymeric compositions. Other objectives will be obvious to those skilled in the art from a reading of the following specification and claims.

2. Prior Art

Most antioxidants, stabilizers of polymerizable materials, and free-radical scavengers can be added only in very small amounts to polymerizable systems so that ultimate curing will still occur in end-use application. Thus, phosphites, mono and poly phenols, sulfides, quinones, etc., are effective as stabilizers against heat, oxygen, peroxide or other free-radical initiating agents, but usually such agents must be inactivated before ultimate cure occurs.

The compound $(C_2H_5O)_2P(O)CH_2N(CH_2CH_2OH)_2$, which is made from diethanolamine, formaldehyde and diethylphosphonate, acts as a polyol reagent in the polymerization of rigid urethane foams and serves as a flame retardant. The compound Phosgard C22R (a polyphosphonate) serves as a flame retardant in urethane foams. It is prepared by reacting phosphorus chloride with ethylene oxide, then treating with acetaldehyde, followed by thermal rearrangement.

Triphenyl phosphite has been used as a modifier for epoxies. The phosphite undergoes transesterification with the epoxy resin so as to become incorporated as a cross-linking agent.

U.S. Pat. No. 3,422,030 discloses the use of an alkyl phenyl phosphite as an additive to alkylated phenols. The phosphite inhibits discoloration of the alkylated phenols by acting as an antioxidant. The patent is limited to eutectic comelts. A typical phosphite is tri(nonylphenyl) phosphite. U.S. Pat. No. 3,412,118 discloses the use of salts of 2,6- and 2,4,6-substituted primary alkyl phosphites as additives to organic materials to prevent peroxidation. U.S. Pat. No. 3,328,300 discloses the use of alkyl aromatic amines, or alkyl substituted phenols with acenaphth[1,2-α]acenaphythylene as an antioxidant for liquid hydrocarbons, etc.

BROAD DESCRIPTION OF THE INVENTION

This invention involves a process for preparing a shelf-stable burn-resistant polymeric composition. The process involves a photocurable composition which comprises (a) zero to about 98 parts by weight of an ethylenically unsaturated polyene having at least two reactive ene groups per molecule, (b) about 100 to about 3 parts by weight of a polythiol containing two or more thiol groups per molecule, (c) about 0.0005 to about 50 parts by weight photocuring rate accelerator, based on 100 parts by weight of said polyene and said polythiol, and (d) about 0.1 to about 98 parts by weight of a free-radical scavenger-vinyl stabilizer, based on 100 parts by weight of said polyene and said polythiol, where the sum of the functionalities of said polyene and said polythiol is greater than four. The photocurable composition can be stored in the dark or in the absence of substantial free-radical generation for up to 6 months. The system is stable up to about 100° C. for much shorter periods of time. The photocurable composition is cured by free-radical generation in excess of that scavenged by said free-radical scavenger-vinyl stabilizer to form a solid useful product. When used in larger amounts, e.g., 6 to 35 wt. percent of the photocurable composition, a burn-resistant polymeric composition is formed.

The stabilizer scavenges any free-radicals generated during storage and then polymerizes with the polythiol when cured. The curing is done by free-radical generation in excess of what the stabilizer can handle. Such excessive free-radical generation is effected by exposure to ultraviolet light or any other method of free-radical generation (initiation).

The free-radical scavenger-vinyl stabilizer is selected from the group consisting of vinyl phenols, vinyl alkyl ethers of phenols, vinyl quinones, vinyl substituted quinones, vinyl amines, vinyl sulfur compounds, vinyl arsines, vinyl stibines, vinyl bismuthines, vinyl phosphites, vinyl arsenites, vinyl nitrites, vinyl phosphines, and vinyl stannites. The preferred stabilizers are diallyl phosphite and triallyl phosphite. The vinyl stabilizer should be polyvinyl, i.e., have at least two vinyl groups for polymerization.

This invention also includes the stabilized systems during storage and the resultant cured, solid, burn-resistant, polymeric compositions.

DETAILED DESCRIPTION OF THE INVENTION

The useful free-radical vinyl stabilizers are vinyl compounds, that is, the compounds have the vinyl grouping ($CH_2=CH-$). For example, the scope of the term vinyl compounds includes the allyl grouping ($CH_2=CH-CH_2-$) and the crotyl grouping.

The amount of vinyl stabilizer admixed with the polythiol, or with the polythiol and the polyene can range from about 0.1 to about 98 parts by weight (preferably 6 to 35 parts by weight) based upon 100 parts of polythiol or polythiol and polyene. Obviously, a high degree of fire-resistance requires a high content of vinyl stabilizer.

The vinyl stabilizers are actually within the defined scope of the polyene, so as used herein the term polyene excludes the vinyl stabilizers.

Examples of useful vinyl amines are: allyldiethylamine; diallylamine; diallylethylamine; allylmethyl ethylamine; allyldipropylamine; diallybutylamine; allyl amine, $CH_2=CHCH_2NH_2$; N-methylallyl amine, $CH_2=CHCH_2NHCH_3$; allyldimethylamine; diallylpropylamine; diallylmethylamine; diallylisoamylamine; N-allyl-N-phenyl-amine; N-N-diallyl-N-phenyl amine; N-allyl-N-isopropyl-N-phenylamine; tri-allylamine; dioleylamine; etc.

Examples of useful vinyl sulfur compounds are: allyl thiourea, $CH_2=CHCH_2NH-CS-NH_2$; diallythiourea; diallylsulfide, $(CH_2=CHCH_2)_2S_3$; allyl trisulfide, $(CH_2-CHCH_2)_2S_3$; allyl mercaptan, $CH_2=CHCH_2SH$; diallyl disulfide, $CH_2=CHCH_2S_2CH_2CH=CH_2$; diallyl sulfate, $(CH_2=CHCH_2)_2SO_4$; lead allylmercaptide, $(C_3H_5S)_2Pb$; allyl thiocyanate, $CH_2=CHCH_2SCN$; allylisothiocyanate, $CH_2=CHCH_2NCS$; etc.

Examples of useful arsenites are the following allyl and vinyl compounds: $C_3H_5OAs(OH)_2$; $C_3H_5OAsO$; $(C_3H_5O)_3As$; $(CH_2=CHO)(C_6H_5O)_2As$; $(CH_2=CHO)_2(C_6H_5O)As$; etc.

Examples of useful stannites are: diallylstannone, $(C_3H_5)_2SnO$; $(C_3H_5)_2SnS$, etc.

Examples of useful phosphorous compounds are: triallyl phosphite, $(CH_2=CHCH_2O)_3$; triallylphosphate, $(C_3H_5O)_3PO$; vinyl diphenyl phosphite; divinylphenyl phosphite; divinylphenyl phosphonate; vinyl diphenyl phosphonate; etc.

Examples of useful vinyl phenolic compounds are: o-vinyl phenol; 2-allylphenol; 2,6-diallyphenol; 2,4,6,-triallyphenol; 2-allyl-1-naphthol; 1-allyl-2-naphthol; 3-allylcatechol; 4-allylcatechol; 3,6-diallylcatechol; 3,4,6-triallylcatechol; tetraallylcatechol; 4-allylrescorcinol; 4,6-diallylrescorcinol; 2,3-diallylhydroquinone; 2,5-diallylhydroquinone; 2,3-diallyl-1,4-naphthohydroquinone; 5-allyl-pyrogallol; triallyl ether of pyrogallol; diallylether of hydroquinone; etc. The term phenol or phenolic compound includes polyhydroxy aromatic compounds such as catechol and polycyclic compounds such as 1-naphthol.

Examples of useful vinyl alkyl phenolic compounds are: 2-allyl-6-methylphenol; 2-allyl-3-methylphenol; 2-allyl-4-methylphenol; 2-allyl-4-butylphenol; 2-allyl-4,6-dimethylphenol; 4-allyl-2,6-dimethylphenol; 2-allyl-3,4-dimethylphenol; 2-allyl-4,5-dimethylphenol; 2-allyl-3,5-dimethylphenol; 2-allyl-4-t-butyl-6-methylphenol; 2-allyl-4-methyl-6-isopropylphenol; 2allyl-3,5,6-trimethylphenol; 6-allyl-3,7-dimethyl-1-naphthol; 2,6-diallyl-4-methylphenol; 2,4-diallyl-6-methylphenol; etc.

An example of a useful substituted vinyl phenolic compound is: vinyl phenylacetate, $(CH_2=CH)C_6H_4(OAc)$.

Examples of useful vinyl nitrate products are: 3-nitropropene, $CH_3CH=CHNO_2$; allyl nitrite, $CH_2=CHCH_2-O-NO$; 2-nitrostyrene; 1-vinyl-6-nitronaphthalene; isobutenylnitrite; etc.

An example of a useful vinyl phosphine is: trivinyl phosphine. An example of a useful vinyl stibine is: trivinyl stibine. An example of a useful vinyl arsine is: trivinyl arsine. A useful example of a vinyl bismuthine is: trivinyl bismuthine. The analogous allyl compounds are also useful.

The useful vinyl stabilizer can be formed in situ or formed, when in mixture, by molecular rearrangement, molecular cleavage, etc.

The ingredients in the photocurable composition can be:

1. zero to about 98 parts by weight of an ethylenically unsaturated polyene containing two or more reactive unsaturated carbon-to-carbon bonds;
2. 100 to about 2 parts by weight of a polythiol;
3. about 0.0005 to about 50 parts by weight (based on 100 parts by weight of (1) and (2)) of a photocuring rate accelerator; and
4. about 0.1 to about 98 parts by weight (based on 100 parts by weight of (1) and (2)) of a free-radical vinyl stabilizer.

The reactive carbon-to-carbon bonds of the polyenes are preferably located terminally, near terminally, and/or pendant from the main chain. The polythiols, preferably contain two or more thiol groups per molecule. These photocurable compositions are liquid in the temperature range encountered.

The photocurable composition can broadly contain 100 percent of the polythiol with the stated amounts of free-radical vinyl stabilizer and photocuring rate accelerator. As used herein the vinyl stabilizers are excluded from the definition of polyene.

Included in the term "liquid," as used herein, are those photocurable compositions which in the presence of inert solvent, aqueous dispersion or plasticizer have a viscosity ranging from essentially zero to 20 million centipoises at 70° C. The term "liquids" includes suspensions, etc.

As used herein, polyenes and polyynes refer to simple or complex species of alkenes or alkynes having a multiplicity, i.e., at least 2, "reactive" carbon-to-carbon unsaturated functional groups per average molecule. For example, a diene is a polyene that has two "reactive" carbon-to-carbon double bonds per average molecule, while a diyne is a polyyne that contains in its structure two "reactive" carbon-to-carbon triple bonds per average molecule. Combinations of "reactive" double bonds and "reactive" triple bonds within the same molecule are also operable. An example of this is monovinylacetylene, which is a polyeneyne under our definition. For purposes of brevity all these classes of compounds will be referred to herein as polyenes.

As used herein, the term "reactive" unsaturated carbon-to-carbon groups means groups which will react under proper conditions as set forth herein with thiol groups to yield the thioether linkage

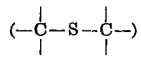

, as contrasted to the term "unreactive" carbon-to-carbon unsaturation such as found in aromatic nuclei (cyclic structures exemplified by benzene, pyridine, anthracene, and the like) that do not under the same conditions react with thiols to give thioether linkages. In the instant invention, products from the reaction of polyenes with polythiols which contain 2 or more thiol groups per average molecule are called polythioether polymers or polythioethers.

Methods of preparing various polyenes useful within the scope of this invention are disclosed in copending application having Ser. No. 674,773, filed Oct. 12, 1967, now abandoned and assigned to W. R. Grace & Co. Some of the useful polyenes are prepared in the detailed examples, set forth in the following specification.

One group of polyenes operable in the instant invention is that taught in a copending application having Ser. No. 617,801; inventors: Kehr and Wszolek; filed Feb. 23, 1967; now abandoned and assigned to W. R. Grace & Co. This group includes those having a molecular weight in the range of 50 to 20,000, a viscosity ranging up to 20 million centipoises at 70° C. of the general formula: $[A]-(X)_m$ wherein X is a member of the group consisting of

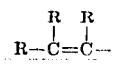

and $R-C\equiv C-$; $m$ is at least 2; R is independently selected from the group consisting of hydrogen, halogen, and an organic compound selected from the group consisting of aryl, substituted aryl, cycloalkyl, substituted cycloalkyl, aralkyl, substituted aralkyl, alkyl and substituted alkyl groups containing 1 to 4 carbon atoms; and A is a polyvalent organic moiety free of unsaturated groups in conjunction with the reactive ene or yne groups in X. Thus A may contain cyclic groupings and minor amounts of hetero atoms such as N, S, P or O, but contains primarily carbon-carbon, carbon-oxygen or silicon-oxygen claim linkages without any reactive carbon-to-carbon unsaturation. This group preferably has a molecular weight over 50.

In this first group, the polyenes are simple or complex species of alkenes or alkynes having a multiplicity of pendant, terminally or near terminally positioned "reactive" carbon-to-carbon unsaturated functional groups per average molecule. As used herein for determining the position of the reactive functional carbon-to-carbon unsaturation, the term "terminal" means that said functional unsaturation is at an end of the main chain in the molecule; whereas by "near terminal" is meant that the functional unsaturation is not more than four carbon atoms away from an end of the main chain in the molecule. The term "pendant" means that the reactive carbon-to-carbon unsaturation is located terminally or near terminally in a branch of the main chain as contrasted to a position at or near the ends of the main chain. For purposes of brevity, all of these positions will be referred to generally as "-terminal" unsaturation.

The liquid polyenes operable in this first group contain one or more of the following types of nonaromatic and nonconjugated "reactive" carbon-to-carbon unsaturation:

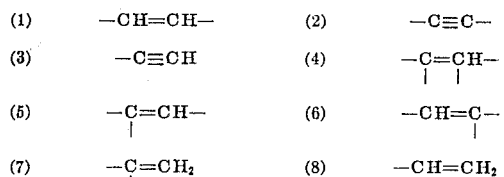

The functional groups as shown in 1-8 supra are situated in a position either which is pendant, terminal or near terminal with respect to the main chain but are free of terminal conjugation. As used herein, the phrase "free of terminal conjugation" means that the terminal "reactive" unsaturated groupings may not be linked directly to nonreactive unsaturated species such as

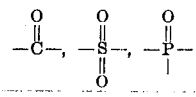

and the like, so as to form a conjugated system of unsaturated bonds exemplified by the structure

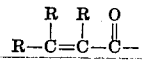

On the average the polyenes must contain 2 or more "reactive" unsaturated carbon-to-carbon bonds per molecule and have a viscosity in the range from slightly above 0 to about 20 million centipoises at 70° C. Included in the term "polyenes" as used herein are those materials which in the presence of an inert solvent, aqueous dispersion of plasticizer fall within the viscosity range set out above at 70° C. Operable polyenes in the instant invention have molecular weights in the range of about 50 to about 20,000, preferably about 500 to about 10,000.

Examples of operably polyenes from this first group include, but are not limited to:

1. Crotyl-terminated polyurethanes which contain two "reactive" double bonds per average molecule in a near terminal position of the average general formula:

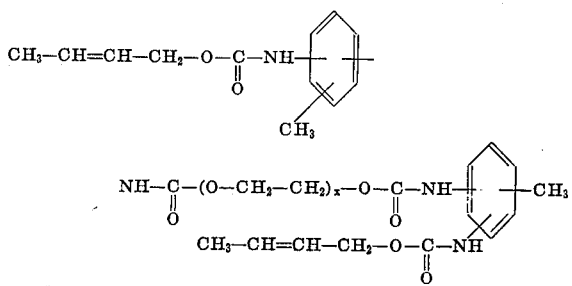

wherein $x$ is at least 1.

2. Ethylene/propylene/nonconjugated diene terpolymers, such as "Nordel 1040" manufactured by E. I. duPont de Nemours & Co., Inc., which contain pendant "reactive" double bonds of the formula: $-CH_2-CH=CH-CH_3$ 3. The following structure which contains terminal "reactive" double bonds:

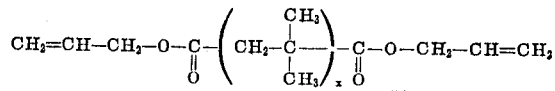

where $x$ is at least 1.

4. The following structure which contains near terminal "reactive" double bonds

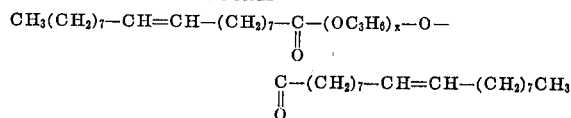

where $x$ is at least 1.

Another, or second, group of operable polyenes includes those unsaturated polymers in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber and the like; and unsaturated polyesters, polyamides, and polyurethanes derived from monomers containing "reactive" unsaturation, e.g., adipic acid-butenediol, 1,6-hexanediamine-fumaric acid and 2,4-tolylene diisocyanate-butenediol condensation polymers and the like.

As used herein, the term polythiols refers to simple or complex organic compounds having a multiplicity of pendant or terminally positioned -SH functional groups per average molecule.

On the average the polythiols must contain 2 or more -SH groups per molecule. They usually have a viscosity range of slightly above 0 to about 20 million centipoises (cps.) at 70° C., as measured by a Brookfield Viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range about 50 to about 20,000, or more, preferably about 100 to about 10,000.

The polythiols operable in the instant invention can be exemplified by the general formula: $R_a-(SH)_n$ where $n$ is at least 2 and $R_a$ is a polyvalent organic moiety free from "reactive" carbon-to-carbon unsaturation. Thus $R_a$ may contain cyclic groupings and minor amounts of hetero atoms such as N, S, P or O but primarily contains carbon-hydrogen, carbon-oxygen, or silicon-oxygen chain linkages free of any "reactive" carbon-to-carbon unsaturation.

One class of polythiols operable with polyenes in the instant invention to obtain essentially odorless compositions are esters of thiol-containing acids of the general formula: $HS-R_b-COOH$ where $R_b$ is an organic moiety containing no "reactive" carbon-to-carbon unsaturation, with polyhydroxy compounds of the general structure: $R_c-(OH)_n$ where $R_c$ is an organic moiety containing no "reactive" carbon-to-carbon unsaturation and $n$ is 2 or greater. These components will react under suitable conditions to give a polythiol having the general structure:

where $R_b$ and $R_c$ are organic moieties containing no "reactive" carbon-to-carbon unsaturation and $n$ is 2 or more.

Certain polythiols such as the aliphatic monomeric polythiols (ethane dithiols, hexamethylene dithiol, decamethylene dithiol, tolylene-2,4-dithiol, etc.) and some polymeric polythiols such as a thiol-terminated ethylcyclohexyl dimercaptan polymer, etc., and similar polythiols which are conveniently and ordinarily synthesized on a commercial basis, although having obnoxious odors, are operable in this invention. Examples of the polythiol compounds preferred for this invention because of their relatively low odor level and and fast curing rate include but are not limited to esters of thioglycolic acid HS–CH$_2$COOH), α-mercaptopropionic acid (HS–CH(CH$_3$)CY–COOH) and β-mercaptopropionic acid (HS–CH$_2$CHCOOH) with polyhydroxy compounds such as glycols, triols, tetrols, pentols, hexols, etc. Specific examples of the preferred polythiols include but are not limited to ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis(β-mercaptopropionate), all of which are commercially available. A specific example of a preferred polymeric polythiol is poly(propylene ether) glycol bis(β-mercaptopropionate) prepared from poly(propylene ether) glycol e.g., Pluracol P2010, Wyandotte Chemical Corp.) and β-mercaptopropionic acid by esterification.

The preferred polythiol compounds are characterized by a low level of mercaptanlike odor initially, and after reaction give essentially odorless cured polythioether end products which are commercially useful resins or elastomers for printing plates.

As used herein, the term "odorless" means the substantial absence of the well-known offensive and sometimes obnoxious odors that are characteristic of hydrogen sulfide and the derivative family of compounds known as mercaptans.

The term "functionality" as used herein refers to the average number of ene or thiol groups per molecule in the polyene and/or the polythiol. For example, a triene is a polyene with an average of three "reactive" carbon-to-carbon unsaturated groups per molecule and thus has a functionality $f$ of 3. A polymeric dithiol is a polythiol with an average of two thiol groups per molecule and thus has a functionality $f$ of 2.

It is further understood and implied in the above definitions that in these systems the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. Such a product is useful in the instant invention and is referred to herein as having a functionality of 2.

To obtain the maximum strength, resistance to low atmospheric pressures, heat resistance and freedom from tackiness, the reaction components consisting of the polyenes and polythiols of this invention generally are formulated in such a manner as to give solid, cross-linked, three dimensional network polythioether polymer systems on curing. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The photocuring reaction can be initiated by U.V. radiation contained in actinic radiation from sunlight or obtained from special light sources which emit significant amounts of U.V. light. (Useful U.V. radiation generally has a wavelength in the range of about 2,000 to about 4,000 Angstrom units.) Thus, it is possible merely to expose the composition to actinic radiation under ambient conditions or otherwise and obtain a cured solid elastomeric or resinous product useful as a rigidizing material. But this approach to the problem results in extremely long exposure times which cause the process in the vast bulk of applications to be commercially unfeasible. Chemical photocuring rate accelerators (photoinitiators or sensitizers or activators) serve to drastically reduce the exposure time and thereby when used in conjunction with various forms of energetic radiation (containing U.V. radiation) yield very rapid, commercially practical photocures by the practice of the instant invention. Useful photocuring rate accelerators include benzophenone, acetophenone, acenapthene-quinone, methyl ethyl ketone, thioxanthen-9-one, 7-H-benz-(de)-antracene-7-one, dibenzosuberone, 1-naphthaldehyde, 4,4'-bis-(dimethylamino)benzophenone, fluorene-9-one, 1'-acetonaphthone, 2'-acetonaphthone, 2,3-butanedione, anthraquinone, 1-indanone, 2-tert-butyl anthroquinone, valerophenone, hexanophenone, 8-phenylbutyrophenone, p-morpholinopropiophenone, 4-morpho-linobenzophenone, 4'-morpholinodesoxybenzoin, p-diacetylbenzene, 4-aminobenzophenone, 4'-methoxyacetophenone, benzaldehyde, α-tetralone, 9-acetylphenanthrene, 3-acetylindole, 1,3,5-triacetylbenzene; etc., and blends thereof. The photoinitiators are added in an amount ranging from about 0.0005 to about 50 percent by weight of the polyene and polythiol components in the instant invention. Benzophenone is the preferred photocuring rate accelerator.

The compositions to be photocured, in accord with the present invention, may, if desired, include such additives as antioxidants, inhibitors, activators, fillers, antistatic agents, flame-retardant agents, thickeners, thixotropic agents, surface-active agents, viscosity modifiers, plasticizers, and the like within the scope of this invention. Such additives are preblended with the polyene or polythiol prior to impregnating it in and/or on the ultimate structure. The aforesaid additives may be present in quantities up to 500 parts or more per 100 parts photocurable composition by weight and preferably 0.0005 to 300 parts on the same basis. The type and concentration of the additives must be selected with great care so that the final composition remains photocurable under conditions of exposure encountered.

The compounding of the components prior to photocuring can be carried out in any conventional manner which takes into account that the material is sensitive to U.V. radiation. These compositions generally can be stored in the dark for extended periods of time prior to actual use or even incorporation in the ultimate structure.

The following examples will aid in explaining, but should not be deemed as limiting the instant invention. In all cases, unless otherwise noted, all parts and percentages are by weight.

EXAMPLE 1

Triallyl phosphite (2 grams) and "Q-43 Ester" (3.7 grams) (which is the tetramercaptan prepared from pentaerythritol and β-mercaptopropionic acid and which is commercially available from Carlisle Chemical Co.) were mixed with 0.012 grams dibenzosuberone, and the mixture was exposed to U. V. light using a Blak-Ray Gun No. 22 for 2 minutes. A surface cure was noted in 5 seconds. The sample became hot (75° C.) and was completely cured in 120 seconds (no stickiness on top or bottom). This cured resin was self-extinguishing after 30 seconds ignition in a Bunsen Burner flame. The uncured resin could be stored at room temperature for a year without gelation.

EXAMPLE 2

One hundred grams of epoxytetraene (prepared from diallylamine and Epon epoxy compound 828) was mixed with a stoichiometric amount of Q-43 and stabilized by addition of 0.01 mole (2 weight percent) triallyl phosphite per 100 grams of epoxytetraene. The prepolymer mixture plus 0.002 weight percent dibenzosuberone, remained stable for 30 days at 80° C. in a dark room but cured under U. V. light (Blak-Ray) in 5 minutes to a relatively hard cure. Shore A hardness was 50.

EXAMPLE 3

Example 2 was repeated, but the photocuring was accomplished with sunlight (for 5 minutes) instead of the Blak-Ray Gun. A hard cure was obtained.

EXAMPLE 4

Example 1 was repeated, except that 2.3 grams of diallylbutylamine was used instead of the triallyl phosphite. A burn-resistant polymer was obtained.

EXAMPLE 5

Example 1 was repeated, except that 1.7 grams of diallylsulfide were used instead of the triallyl phosphite. A burn-resistant polymer was obtained.

EXAMPLE 6

Example 1 was repeated, except that 3.2 grams of diallylstannone was used instead of the triallyl phosphite. A burn-resistant polymer was obtained.

EXAMPLE 7

Example 1 was repeated, except that 2.8 grams of 2,3-diallylhydroquinone was used instead of the triallyl phosphite. A burn-resistant polymer was obtained.

EXAMPLE 8

Example 1 was repeated, except that 2 grams of tetraallylcatechol was used instead of the triallyl phosphite. A burn-resistant polymer was obtained.

EXAMPLE 9

Example 1 was repeated, except that 2.1 grams of 2,4,6-triallylphenol was used instead of the triallyl phosphite. A burn-resistant polymer was obtained.

EXAMPLE 10

Example 2 was repeated, except that 0.75 gram of diallylbutylamine was used instead of the triallyl phosphite. A shelf-stable prepolymer system was obtained which did not gel during 6 months storage at 25° C. Before curing, the prepolymer system is often referred to as the curable or photocurable composition.

EXAMPLE 11

Example 2 was repeated, except that 0.7 gram of diallylsulfide was used instead of the triallyl phosphite. A shelf-stable prepolymer was obtained which did not gel during 6 months storage.

EXAMPLE 12

Example 2 was repeated, except that 1.0 gram of diallylstannone was used instead of the triallyl phosphite, and a di(bromophenyl)oxytetraene (10 percent bromine) was used as the polyene. A burn-resistant shelf-stable polymer was obtained.

EXAMPLE 13

Example 2 was repeated, except that 1 gram of 2,3-diallylhydroquinone was used instead of the triallyl phosphite. A shelf-stable prepolymer system was obtained which did not gel at 90° C. for 30 days.

EXAMPLE 14

Example 2 was repeated, except that 1 gram of tetraallylcatechol was used instead of the triallyl phosphite. A shelf-stable polymerizable prepolymer system was obtained.

EXAMPLE 15

Example 2 was repeated, except that 0.8 gram of 2,4,6-triallylphenol was used instead of the triallyl phosphite and a bromine-containing epoxytetraene (16 percent Br) was used as the polyene. The epoxytetraene of example 2 was blended with sufficient dibromoanalog to give a blend containing 7.2 bromine. Before curing, a shelf-stable (at 30° C.) prepolymer system was obtained. A burn-resistant polymer was obtained upon curing. The cured sample contained 7.2 percent bromine and 1 percent triallyl phosphite.

EXAMPLES 16 to 21

Example 1 was repeated six times, except that the dibenzosuberone was replaced with cyclohexanone (0.05 gram), acetone (0.03 gram), methyl ethyl ketone (0.04 gram), dibenzophenone (0.02 gram), a blend of acetone (0.02 gram), and p-diacetylbenzene (0.01 gram), and 3-acetylphenanthrene (0.03 gram), respectively. A solid, burn-resistant polymeric composition was obtained in each instance.

EXAMPLES 22 to 25

Example 1 was repeated four times, except that the pentaerythritol tetrakis($\beta$-mercaptopropionate) was replaced with trimethylolpropane tris($\beta$-mercaptopropionate) (3.1 grams), trimethylolpropane tris (thioglycolate) (2.7 grams), pentaerythritol tetrakis (thioglycolate) (3.2 grams), dipropylene glycol bis($\beta$-mercaptopropionate) average molecular weight 410 (3.0 grams) respectively. A burn-resistant, solid, polymeric composition was obtained in each instance. The uncured composition was shelf stable for 6 months at 30° C.

EXAMPLE 26

Example 1 was repeated, except that half of the pentaerythritol tetrakis($\beta$-mercaptopropionate) was replaced with 1.9 grams of ethylene glycol bis($\beta$-mercaptopropionate). A solid burn-resistant, polymeric composition was obtained which did not gel at 25° C. during six months storage.

EXAMPLE 27

Example 2 was repeated, except that 100 grams of polymer A was used in place of 100 grams epoxytetrene. Polymer A was prepared as follows: 458 grams (0.23 mole) of a commercially available liquid polymeric diisocyanate sold under the trade name "Adiprene L-100" by E. I. duPont de Nemours & Co. was charged to a dry resin kettle maintained under a nitrogen atmosphere and equipped with a condenser, stirrer, thermometer, and gas inlet and outlet. 37.8 grams (0.65 mole) of allyl alcohol was charged to the kettle and the reaction was conducted for 17 hours with stirring at 100° C. Thereafter, the nitrogen atmosphere was removed and the kettle was evacuated for 8 hours at 100° C. 500 cc. dry benzene was added to the kettle and the reaction product was azeotroped with benzene to remove the unreacted alcohol. This allyl-terminated liquid polymer has a molecular weight of approximately 2,100 and was labeled polymer A.

A solid, polymeric composition was obtained from the reaction with Q-43 in stoichiometric amount with the shelf stable prepolymer system.

EXAMPLES 28 to 33

Example 2 was repeated six times, except that the dibenzophenone was replaced with cyclohexanone (0.05 mole percent), acetone (0.1 mole percent), methyl ethyl ketone (0.1 mole percent), dibenzophenone (0.02 mole percent), a blend of acetone (0.01 mole percent), and p-diacetylbenzene (0.005 mole percent) and 3-acetylphenanthrene (0.01 mole percent) respectively. A solid, burn-resistant polymeric composition was obtained in each instance.

EXAMPLE 34

Example 2 was repeated, except that 100 grams of polymer B was used in place of 100 grams epoxytetraene. Polymer B was prepared as follows: 1,500 grams (0.47 mole) of a linear solid polyester diol having a molecular weight of 3,200 and commercially available from Hooker Chemical Corporation under the trade name "Rucoflex S-1,011-35" was charged to a 3-liter, 3-necked flask and heated to 110° C. under vacuum and nitrogen for 1 hour with stirring. 83 grams of allyl isocyanate having a molecular weight of 83.1 and commercially available from Upjohn Co. was added to the flask along with 0.3 cc. of dibutyl tin dilaurate (catalyst), commercially available from J. T. Baker & Co. The reaction was continued at 100° C. with stirring for 1 hour. This allyl-terminated polymer was labeled polymer B. A solid, shelf-stable, polymeric composition was obtained.

EXAMPLES 35 to 38

Example 2 was repeated four times, except that the pentaerythritol tetrakis($\beta$-mercaptopropionate) was replaced with 100 grams trimethylolpropane tris($\beta$-mercaptopropionate) 100 grams trimethylolpropane tris(thioglycolate), 100 grams pentaerythritol tetrakis(thioglycolate), 100 grams propylene glycol bis($\beta$-mercaptopropionate) (mole wt. 410), respectively. A shelf-stable, solid, polymeric composition was obtained in each instance.

EXAMPLE 39

Example 1 was repeated, except that half of the pentaerythritol tetrakis($\beta$-mercaptopropionate) was replaced with 1.0 grams of ethylene glycol bis($\beta$-mercaptopropionate). A solid, shelf-stable, burn-resistant, polymeric composition was obtained.

EXAMPLE 40

Six grams pentaerythritol tetrakis($\beta$-mercaptopropionate) were admixed with 3.95 grams of epoxytetraene (prepared from condensation of 2 moles of diallylamine and 1 mole of a diepoxy compound of about 1.92 equivalent weight supplied by Shell Chemical Co. as Epon 828 0.7 grams triallylphosphite and 0.2 gram dibenzosuberone. This was cured by exposing to Blak Ray Lamp No. 22 for 5 minutes, the cured sample was turned over and exposed an additional 5 minutes to the same radiation. Its odor indicates presence of trace volatiles. The sample was baked an hour at 125° C. and was then ignited for 30 seconds in a Bunsen Burner flame. The sample containing 6.5 percent triallylphosphite self-extinguished in 59 seconds.

EXAMPLE 41

Example 41 was similar to example 40, except that the mixture contained 6.7 grams of Q–43, 3.0 grams of the same epoxytetraene, 1.67 grams triallyl phosphite and 0.02 gram dibenzosuberone. The cured sample containing 14.7 percent triallyl phosphite after the 1 hour bake at 125° C. self-extinguished in 31 seconds in the same burning test.

EXAMPLE 42

Example 40 was repeated using the same epoxytetraene product, but which contained 0.01 weight percent hydroquinone. The cured baked product self-extinguished in 60 seconds.

EXAMPLE 43

Example 42 was repeated with the same epoxytetraene product but which contained 0.01 weight percent Ionol (Shell Chemical Co. antioxidant (ditertiarybutyl-p-cresol)). The cured baked product was self-extinguishing.

What is claimed is:

1. A process for preparing a shelf-stable photocurable polymeric composition said process comprising admixing a photocurable composition which comprises (a) zero to about 98 parts by weight of an ethylenically unsaturated polyene having at least two reactive ene groups per molecule, (b) 100 to about 2 parts by weight of a polythiol containing two or more thiol groups per molecule, (c) about 0.0005 to about 50 parts by weight photocuring rate accelerator, based on 100 parts by weight of said polyene and said polythiol, and (d) about 0.1 to about 98 parts by weight of at least one free-radical scavenger-vinyl stabilizer selected from the group consisting of vinyl phenols, vinyl alkyl ethers of phenols, vinyl quinones, vinyl substituted quinones, vinyl amines, vinyl sulfur compounds, vinyl phosphites, vinyl arsenites, vinyl nitrites, vinyl stannites, vinyl phosphines, vinyl stibines, vinyl arsines and vinyl bismuthines, based on 100 parts by weight of said polyene and said polythiol, where the sum of the functionalities of said polyene and said polythiol is greater than 4.

2. A process as described in claim 1 wherein said photocurable composition is cured by free-radical generation in excess of that scavenged by said free-radical scavenger-vinyl stabilizer to form a solid, polymeric composition.

3. A process as described in claim 1 wherein said curing is achieved by exposing said photocurable composition to ultraviolet light.

4. A process as described in claim 2 wherein said vinyl stabilizer is present in an amount between about 6 and about 98 parts by weight and wherein said resultant, solid, cured, polymeric composition is burn-resistant.

5. A process as described in claim 1 wherein said photocurable composition is stored up to 9 months before being cured.

6. A process as described in claim 1 wherein said polyene (a), said polythiol (b), said accelerator (c) and said stabilizer (d) are liquids.

7. A process as described in claim 1 wherein said stabilizer is triallyl phosphite.

8. A process as described in claim 1 wherein said polythiol has a molecular weight between about 50 and about 20,000, and has a viscosity between slightly above 0 and about 20,000,000 cps.

9. A process as described in claim 1 wherein said polyene has two, or more, reactive ene groups which are conjugated with other unsaturated groups, or has two, or more, reactive ene groups which are located at the end of or pendant to the main chain of the molecule.

10. A process as described in claim 1 wherein only one free-radical scavenger-vinyl stabilizer is present.

11. A process as described in claim 1 wherein said polyene composition has a molecular weight in the range of 50 to 20,000, has a viscosity ranging up to 20,000,000 centipoises at 70° C., and has the general formula: [A] $(X)_m$ wherein X is a member of the group consisting of

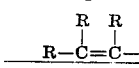

and R–C C–; $m$ is an integer of at least two; R is independently selected from the group consisting of aryl, a substituted aryl, aralkyl, substituted aralkyl, cycloalkyl, substituted aryl, aralkyl, substituted alkyl groups containing one to four carbon atoms; and A is a polyvalent polymeric organic moiety free of (1) reactive carbon-to-carbon unsaturation, and (2) has unsaturated groupings in terminal conjugation with X.

12. A process as described in claim 1 wherein the polyene has a molecular weight in excess of 300.

13. A shelf-stable photocurable composition prepared by the process of claim 1.

14. A burn-resistant polymeric composition prepared by the process of claim 2.

* * * * *